United States Patent
Yancey

(10) Patent No.: US 11,683,349 B2
(45) Date of Patent: *Jun. 20, 2023

(54) DYNAMIC SECURITY POLICY MANAGEMENT

(71) Applicant: Amazon Technologies, Inc., Reno, NV (US)

(72) Inventor: Justin Paul Yancey, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/104,905

(22) Filed: Nov. 25, 2020

(65) Prior Publication Data

US 2021/0211473 A1 Jul. 8, 2021

Related U.S. Application Data

(63) Continuation of application No. 15/616,456, filed on Jun. 7, 2017, now Pat. No. 10,868,836.

(51) Int. Cl.
*H04L 9/40* (2022.01)

(52) U.S. Cl.
CPC ........ *H04L 63/205* (2013.01); *H04L 63/0227* (2013.01); *H04L 63/101* (2013.01); *H04L 63/107* (2013.01); *H04L 63/108* (2013.01); *H04L 63/20* (2013.01)

(58) Field of Classification Search
CPC . H04L 63/205; H04L 63/0227; H04L 63/101; H04L 63/107; H04L 63/108; H04L 63/20; H04L 63/102
See application file for complete search history.

(56) References Cited

U.S. PATENT DOCUMENTS

| 7,835,348 B2* | 11/2010 | Kasralikar | .......... H04L 63/1408 370/360 |
| 8,074,270 B1* | 12/2011 | Lordello | ................. H04L 45/52 726/13 |
| 8,185,935 B2* | 5/2012 | Hsu | ....................... H04L 9/0844 713/170 |
| 8,499,348 B1* | 7/2013 | Rubin | ..................... H04L 63/20 726/25 |

(Continued)

OTHER PUBLICATIONS

Non-Final Rejection issued in U.S. Appl. No. 15/616,456, dated Apr. 11, 2019.

(Continued)

*Primary Examiner* — David Garcia Cervetti
(74) *Attorney, Agent, or Firm* — Hogan Lovells US LLP

(57) ABSTRACT

Security policies can be dynamically updated in response to changes in endpoints associated with those policies. A user can indicate one or more regions or networks from which access is to be granted under a specific security policy. The user can subscribe to receive notifications upon a change relating to those endpoints, such as the addition or removal of one or more endpoints. When a change is detected, new policy information can be generated automatically and published for subscribed policies, which can then have the updates applied automatically or provided for manual review and application. Such a process enables access determinations to be made based upon up-to-date endpoint information.

20 Claims, 10 Drawing Sheets

(56) References Cited

U.S. PATENT DOCUMENTS

| | | | |
|---|---|---|---|
| 8,881,276 B2* | 11/2014 | Kratzer | H04L 63/20 713/168 |
| 9,325,739 B1* | 4/2016 | Roth | G06F 21/604 |
| 9,510,388 B1* | 11/2016 | Gegout | H04W 48/14 |
| 9,584,436 B1* | 2/2017 | Rodgers | G06F 16/9566 |
| 9,736,185 B1* | 8/2017 | Belamaric | H04L 63/20 |
| 9,854,001 B1* | 12/2017 | Roth | H04L 63/20 |
| 9,935,980 B2* | 4/2018 | Karhade | H04L 63/0428 |
| 10,484,334 B1* | 11/2019 | Lee | H04L 67/30 |
| 10,542,077 B1* | 1/2020 | Balakrishnan | H04L 45/70 |
| 2005/0198363 A1* | 9/2005 | Ling | H04W 36/0011 709/224 |
| 2005/0283823 A1* | 12/2005 | Okajo | G06F 21/604 726/1 |
| 2007/0157286 A1* | 7/2007 | Singh | H04L 41/0866 726/1 |
| 2008/0127345 A1* | 5/2008 | Holtmanns | H04L 51/212 726/23 |
| 2008/0175243 A1* | 7/2008 | Bhagwan | G06F 16/951 370/392 |
| 2008/0209535 A1* | 8/2008 | Athey | G06F 21/00 726/11 |
| 2008/0222692 A1* | 9/2008 | Andersson | H04L 63/20 726/1 |
| 2009/0327908 A1* | 12/2009 | Hayton | G06F 21/44 715/744 |
| 2009/0327909 A1* | 12/2009 | Hayton | G06F 21/6218 715/744 |
| 2010/0042674 A1* | 2/2010 | Pantalone | H04L 61/5076 709/203 |
| 2010/0071024 A1* | 3/2010 | Eyada | H04L 63/0263 726/1 |
| 2010/0071043 A1* | 3/2010 | Babula | H04L 63/0272 726/7 |
| 2010/0115101 A1* | 5/2010 | Lain | H04L 63/102 709/227 |
| 2010/0284327 A1* | 11/2010 | Miklos | H04L 41/0893 370/328 |
| 2010/0293596 A1* | 11/2010 | Terry | G06F 21/57 726/3 |
| 2010/0332963 A1* | 12/2010 | Ellis | H04L 67/53 715/239 |
| 2011/0009107 A1* | 1/2011 | Guba | G08G 1/20 455/418 |
| 2011/0158085 A1* | 6/2011 | Aloush | H04L 45/028 370/254 |
| 2011/0231900 A1* | 9/2011 | Shimoe | G06F 21/6218 726/1 |
| 2012/0030751 A1* | 2/2012 | Datta | H04L 63/0428 726/15 |
| 2013/0019276 A1* | 1/2013 | Biazetti | H04L 65/40 726/1 |
| 2013/0047224 A1* | 2/2013 | Radhakrishnan | G06F 21/33 726/6 |
| 2013/0047226 A1* | 2/2013 | Radhakrishnan | G06F 21/33 726/6 |
| 2013/0133059 A1* | 5/2013 | Maman | H04L 63/102 726/12 |
| 2013/0170348 A1* | 7/2013 | Luna | H04W 28/12 370/230.1 |
| 2013/0235822 A1* | 9/2013 | Scherer | H04L 63/0876 370/329 |
| 2013/0247217 A1* | 9/2013 | Junod | G06F 21/42 726/27 |
| 2013/0304917 A1* | 11/2013 | Mittal | H04L 63/101 709/225 |
| 2014/0007214 A1* | 1/2014 | Qureshi | G06F 21/14 726/3 |
| 2014/0032758 A1* | 1/2014 | Barton | H04W 12/37 709/225 |
| 2014/0033271 A1* | 1/2014 | Barton | H04W 12/64 726/1 |
| 2014/0040979 A1* | 2/2014 | Barton | H04W 12/30 726/1 |
| 2014/0245423 A1* | 8/2014 | Lee | H04L 63/20 726/12 |
| 2014/0379915 A1* | 12/2014 | Yang | H04L 63/101 709/225 |
| 2015/0005004 A1* | 1/2015 | Cuervo | H04W 64/00 455/456.1 |
| 2015/0074756 A1* | 3/2015 | Deng | H04L 63/1433 726/1 |
| 2015/0082370 A1* | 3/2015 | Jayaraman | H04L 63/20 726/1 |
| 2015/0131488 A1* | 5/2015 | Perez Martinez | H04M 15/72 370/259 |
| 2015/0188947 A1* | 7/2015 | Zaitsev | H04L 63/0428 726/1 |
| 2015/0312102 A1* | 10/2015 | Backholm | H04L 41/0893 709/223 |
| 2016/0073146 A1* | 3/2016 | Phillips | H04L 65/611 725/34 |
| 2016/0212166 A1* | 7/2016 | Henry | G06F 21/604 |
| 2016/0212167 A1* | 7/2016 | Dotan | G06F 3/04847 |
| 2016/0212170 A1* | 7/2016 | Martherus | H04L 63/20 |
| 2016/0241443 A1* | 8/2016 | Bidaralli | H04L 41/0889 |
| 2016/0277448 A1* | 9/2016 | Saida | H04L 63/20 |
| 2017/0048107 A1* | 2/2017 | Dosovitsky | H04L 41/0816 |
| 2017/0048713 A1* | 2/2017 | Guday | H04W 12/35 |
| 2017/0054757 A1* | 2/2017 | Siswick | G06F 3/04817 |
| 2017/0093913 A1* | 3/2017 | Summers | H04L 63/105 |
| 2017/0099182 A1* | 4/2017 | DeBolle | H04L 41/0893 |
| 2017/0099187 A1* | 4/2017 | Dale | H04L 41/0893 |
| 2017/0214717 A1* | 7/2017 | Bush | G05B 19/4185 |
| 2017/0331692 A1* | 11/2017 | Hague | H04L 63/20 |
| 2017/0331791 A1* | 11/2017 | Wardell | H04L 63/0815 |
| 2017/0374568 A1* | 12/2017 | Heath | H04W 8/18 |
| 2018/0034777 A1* | 2/2018 | Jeong | H04W 4/70 |
| 2018/0176186 A1* | 6/2018 | Chao | H04L 63/1425 |
| 2018/0262454 A1* | 9/2018 | Zandi | H04L 51/214 |
| 2018/0262585 A1* | 9/2018 | Zandi | H04L 43/08 |
| 2018/0262592 A1* | 9/2018 | Zandi | H04L 67/55 |
| 2018/0270363 A1* | 9/2018 | Guday | H04M 15/8083 |
| 2019/0021124 A1* | 1/2019 | Fernandez Alonso | H04W 24/08 |
| 2019/0028992 A1* | 1/2019 | Kim | H04L 12/28 |
| 2020/0037148 A1* | 1/2020 | Wang | H04W 8/20 |

OTHER PUBLICATIONS

Final Rejection issued in U.S. Appl. No. 15/616,456, dated Oct. 28, 2019.

Non-Final Rejection issued in U.S. Appl. No. 15/616,456, dated Mar. 20, 2020.

Notice of Allowance issued in U.S. Appl. No. 15/616,456, dated Aug. 20, 2020.

* cited by examiner

DYNAMIC SECURITY POLICY MANAGEMENT

CROSS-REFERENCE TO RELATED APPLICATIONS

This application is a continuation of U.S. Pat. No. 10,868,836, issued on Dec. 15, 2020, and filed as U.S. patent application Ser. No. 15/616,456, on Jun. 7, 2017, entitled "DYNAMIC SECURITY POLICY MANAGEMENT," the disclosure of which is hereby incorporated by reference herein in its entirety for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Users can perform tasks such as storing data to various types of resources offered by a resource provider. An issue that arises with such services, however, is that the network accessibility is primarily protected using credentials such as username and password. A party obtaining these credentials can then access the services and user data from anywhere in the world. While some approaches allow for access control based upon network address, large enterprises or service providers can have many users with different network addresses that change over time. The need to track the addresses and ensure the appropriate access controls are applied is at best very resource intensive and prone to error, in addition to not being updated in near real time as the addresses change.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of data and resource access in an electronic environment. In particular, various approaches provide for the updating of security policies in response to changes in relevant endpoints associated with those policies. A customer can indicate one or more regions or networks from which access is to be granted under a specific security policy. The customer can subscribe to receive notifications upon a change to the endpoints, such as IP addresses, contained within the one or more regions or networks. When a change is detected, new policy information can be generated automatically and published for subscribed policies, which can then have the updates applied automatically or provided for manual review and application. Such a process enables access determinations to be made based upon up-to-date endpoint information.

Various other such functions can be used as well within the scope of the various embodiments as would be apparent to one of ordinary skill in the art in light of the teachings and suggestions contained herein.

Figure 1:
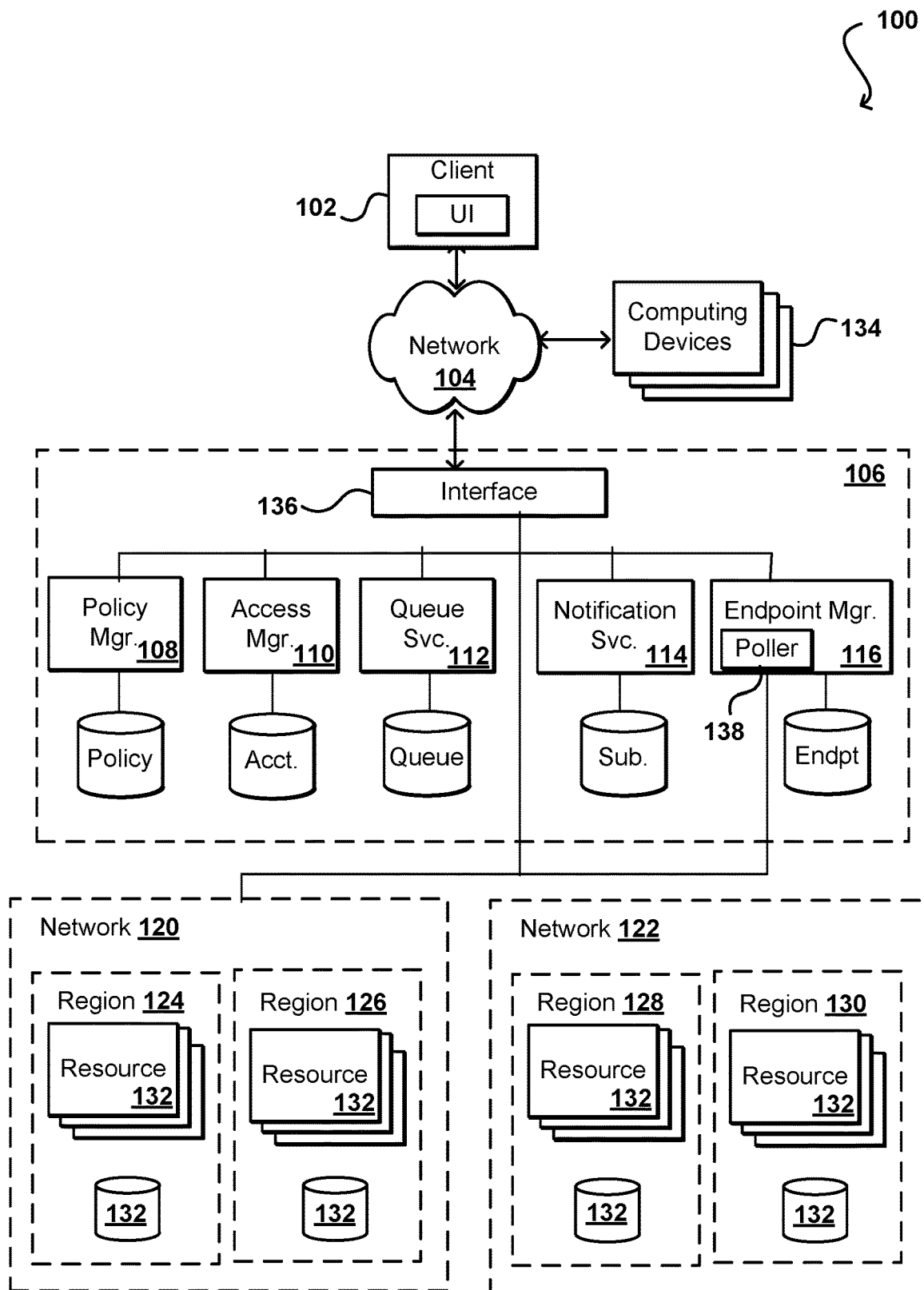
FIG. 1 illustrates an example architecture that can be utilized to implement aspects of various embodiments.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources of one or more types. These types can include, for example, application servers operable to process instructions provided by a user or database servers operable to process data stored in one or more data stores in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 136 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 136, information for the request can be directed to a resource manager or other such system, service, or component configured to manage user accounts and information, resource provisioning and usage, and other such aspects. A resource manager receiving the request can perform tasks such as to authenticate an identity of the user submitting the request, as well as to determine whether that user has an existing account with the resource provider, where the account data may be stored in at least one data store in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider, a key management service, a corporate entity, a certificate authority, an identify broker such as a SAML provider, and the like. In some embodiments, a user can provide information useful in obtaining the credentials, such as user identity, account information, password, user-specific cryptographic key, customer number, and the like. The identity provider can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user. If the user has an account with the appropriate permissions, status, etc., the resource manager can determine whether there are adequate resources available to suit the user's request, and if so can provision the resources or otherwise grant access, such as through communication with an authorization system as discussed herein, to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager (or another such system or service) in this example can also function as a virtual layer of hardware and software components that handles control functions in addition to management actions, as may include provisioning, scaling, replication, etc. The resource manager can utilize dedicated APIs in the interface layer 136, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 136 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Oftentimes, the client device 102 and/or allocated resources can be associated with a specific customer, which can be an individual user or a company or enterprise, among other such options. Accordingly, it can be desirable in at least some situations to enable certain resources, associated with a specific customer, to only be accessed by users or computing resources (hardware, applications, etc.) that are also associated with that customer. As mentioned, credentials can be issued that are required to obtain access to these customer-associated resources. These can include, for example, username and password pairs, customer tokens, and the like. As mentioned, however, should these credentials become compromised or otherwise obtained by a third party, that third party can utilize those credentials to obtain access to the customer-allocated resources. Since services, such as Web services, are often public network (e.g., the Internet) facing, this enables users or resources from anywhere in the world to access these services if obtaining the proper credentials. This can potentially enable the theft of customer data and other such problems.

Accordingly, approaches in accordance with various embodiments attempt to provide an additional level of access control that can help to further protect such resources, services, and other offerings. In various embodiments, the location from which a request for access is generated (or received) can be used to determine whether to grant such access. For example, an access control list (ACL) can be associated with a given resource (or service, etc.), or set of resources, that can indicate the sources for which access requests should be granted, assuming other access criteria are satisfied. The sources can be indicated by specifying, for example, a range or set of addresses or locations from which access requests can be granted. These addresses or location scan include any appropriate values, such as a range of Internet protocol (IP) addresses from which access requests can be granted. Access requests received from other IP addresses can be denied or otherwise handled according to the appropriate access policy. Such an approach can enable an entity to specify the range of IP addresses associated with that entity, such that legitimate access requests should only come from those addresses. A third party obtaining the credentials will then be prevented from accessing the resources from a different address or location.

A difficulty arises, however, in the fact that the IP addresses associated with an entity can change quite frequently. For a large enterprise with locations all over the world, this can include a complex set of addresses that must be maintained and updated with each change in IP address used by that enterprise. This can be very resource and cost expensive, can take an amount of time due to the need for manual intervention, and can be a likely cause of error, which can potentially result in legitimate requests being denied because they are not received from an address identified in the appropriate access control list. In addition to the need to update the access control lists, there can be hundreds of security policies or more that need to access this control list. Incorrect access control lists can potentially result in outages to various services when the wrong addresses are blocked or otherwise denied access.

Approaches in accordance with various embodiments provide programmatic approaches to manage access to control settings for various policies. This can include mechanisms for automatically updating, or providing the information for updating, access control lists or other logs of addresses or locations for which access should be granted, or types of access granted, among other such options. Instead of users having to manually update all relevant security policies when a new endpoint becomes available, or is no longer available, approaches in accordance with various embodiments enable customers to subscribe to a subscription service that can provide the information needed to keep access policies up to date with current endpoint data.

In one embodiment, a customer can utilize an appropriate interface (GUI, API, etc.) to register a customer account with the subscription service, referred to herein as a notification service 114. In addition to registering the account, the interface can enable the customer to utilize various templates, tools, or other mechanisms with the client account to create roles, executable functions, and the like. As part of the registration process, the interface can display or provide information about the various access policies that are available or have been discovered. These can include policies from which the customer can select, or policies already associated with the customer, among other such options. The policies can also be any appropriate types of policies, such as customer-specific policies, default access policies, key management policies, and the like. The interface can also provide information about the various networks, regions, or other groupings that are available for use with the notification service. These can include, for example, sets of resources associated with the resource provider that can provide information each time an endpoint (or request source, IP address, etc.) is added to, or removed from, that network.

Through the interface, the customer can select one or more policies and subscribe those policies to receive updates to the relevant endpoints. This can include, for example, indicating a location to which notifications on the subscription should be sent for a particular policy. In one example, a customer may have an access policy for accessing data stored in a customer data repository hosted in the resource provider environment. The customer can specify the policy, and in some cases the corresponding resource if not already associated with that policy. The user can then also select or specify the network(s) and location(s) from which access requests can be received. For example, in FIG. 1 the customer might specify that access requests are to be permitted for endpoints or addresses associated with resources 132 in a specific region 130 of a specific network 122. Accordingly, requests received from another network 120 or other regions 124, 126, 128 will be denied. Once the user specifies the network(s) and/or region(s), the corresponding endpoints can be associated with the policy, and the policy subscribed to receive updates for the selected networks(s) or region(s). If the set of endpoints associated with the selected networks(s) or region(s) changes, an update notification can be sent to the destination for the policy, which can then trigger an automatic update of the corresponding access control list (ACL) or a manual review of the change, among other such options.

In this example, the notification service 114 can receive information about the endpoint change from an endpoint manager 116, or other such source. The endpoint monitor in one embodiment includes a poller component 138 that can periodically check the endpoints for various regions or locations and provide information about changes in the associated endpoints discovered by the poller component 138. This information can then be provided to the notification service 114, which can determine from a subscriber list or data store which policies have subscribed to receive notifications for that particular region or location. In other embodiments, the notification might publish all changes and enable each policy manager to extract the relevant changes, among other such options. The notification service can then send the notifications to the relative subscribers, which in this embodiment can include at least one policy manager 108 that can use the information to update policies, ACLs, or other policy information stored in a policy data repository or other such location. When a request is received, an access manager 110 can then contact the policy manager 108 (or directly consult the policy data repository) to determine whether the source of the request is allowed per the up-to-date policy.

In some embodiments, the policy manager 108 can automatically build a new policy according to the new endpoint data and cause that policy to be automatically applied on the customer account. In other embodiments, an updated policy can be generated and a customer can download or otherwise obtain the new policy upon a subsequent access under the customer account. In one example, the new policy (or ACL, etc.) could be published on the relevant notification topic associated with the region(s) or location(s), where the publication can occur using an appropriate mechanism (e.g., email, instant messaging, SMS, etc.). The notifications will be push notifications in at least some embodiments, and can be sent to individual subscribers or concurrently to all relevant subscribers, among other such options. In some embodiments, a task-based function can be allocated to automatically update the relevant policies on the account in response to receiving an update on the corresponding notification topic. Such an approach enables near real-time policy updates in response to each endpoint change relevant to a specific policy.

In one embodiment, the poller component 138 can be scheduled to run at regular intervals. At one of the intervals the poller can determine a new endpoint for a region, such as may be represented in one or more database records for the region, and obtain the source data to determine, through a comparison with an existing endpoint list, that the new endpoint corresponds to an update for the region. The poller can then query a subscription repository, or other such source, to determine the policies that are subscribed for that region. This can include multiple policies across one or more customer accounts. The notification service 114 can then obtain copies of the relevant policy definitions or control lists, for example, and update the policy definitions with the new endpoint information. This can include, for example, attaching a new list of IP addresses to a list of approved addresses associated with the policy for the customer account. The new policy definitions, control list, or other such information can then be written to the notification topic and transmitted to the relevant subscriber(s). As mentioned, the customer policies can then be automatically updated if the customer has approved such functionality, or the information can be transmitted for manual review and implementation by the customer. In some embodiments, a ticket can be generated that can trigger an administrator to manually review and apply the update.

In some embodiments, endpoint updates for a region can automatically be written to a queue service 112 or other such location. This can be performed, in some embodiments, using a task-based resource as discussed herein. In such an embodiment, the poller component 138 can periodically check the relevant queue from the queue service 112 to determine whether there are any endpoint updates to be processed by the notification service 114. A timestamp in a relevant data repository can be updated such that changes can be determined with respect to the last update. In other embodiments, the update data can be sent using one or more data streams that can be received to the notification service. Such an approach may not provide the robustness to failure as a queue service, but can provide the data in more real-time and in a time-ordered sequence.

Figure 2:
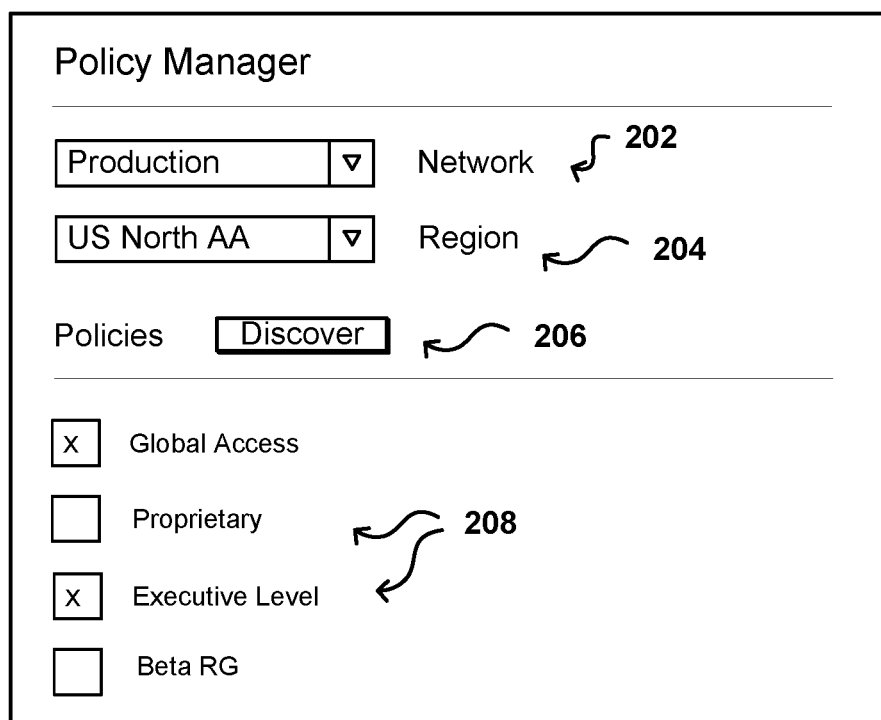
FIG. 2 illustrates an example interface for enabling policy subscriptions that can be analyzed in accordance with various embodiments

FIG. 2 illustrates an example interface 200 that can be utilized in accordance with various embodiments. In this example, a customer can select a discover option 206 to discover polices available on the customer account. These can include policies already associated with the account or ones available to be associated with the account, among other such options. As mentioned, in many embodiments customer policies will exist that are to be used to control access to specific customer resources or services. The customer can then select any or all of the discovered policies 208 for which to specify a region. The customer can then use drop-down boxes, or other such mechanisms, to select at least one network option 202 or region option 204 to apply for the policy. In this example, the selected policies will be associated with those networks and regions, as locations from which access requests can be granted, and the policies can also be automatically subscribed to receive notifications for the specified network(s) and/or region(s). In some embodiments other options may be available as well, such as whether to automatically apply the updates for the selected policies.

Figure 3:
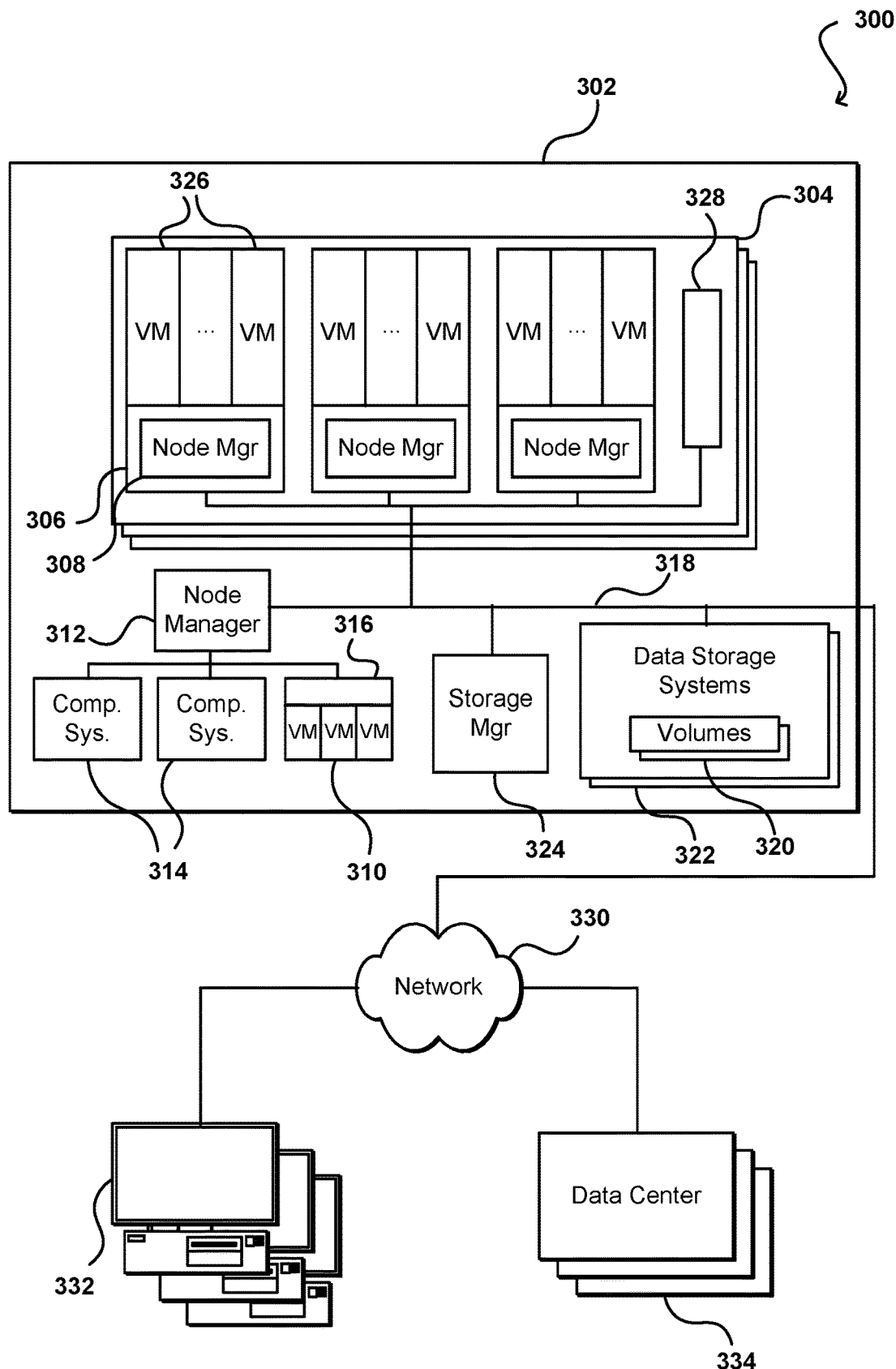
FIG. 3 illustrates an example environment that can be used to implement aspects of the various embodiments.

FIG. 3 illustrates an example network configuration 300 in which computing and data access operations can be performed, along with other such functionality, in accordance with various embodiments. This configuration can include components offered as part of a multi-tenant environment, or resource provider environment 302, wherein the components are provided by a resource provider, and customers pay for access and/or utilization of respective portions of those resources. In this example configuration, the resource provider environment includes a number of racks 304, each rack including a number of host computing devices 306. The host computing systems 306 each host one or more virtual machines. Each virtual machine can act as an independent resource node for executing one or more program copies or performing another such action or process for user data requests, I/O operations, etc. This example configuration also includes computer systems that execute a data storage system or service. The service can utilize a pool of multiple data storage systems, which each have local storage for use in storing one or more volumes 310. Access to the volume copies 310 is provided over an internal network to programs executing on various resource nodes. Thus, an application executing on a virtual machine instance on one of the computer systems 306 can be connected with one or more storage volumes 310 in the data storage systems. This is referred to herein as the instance being "attached" to the storage volume(s). In this example configuration, multiple computing systems are operable to execute various programs, applications, and/or services, and further operable to access reliable data storage, such as under the control of a data storage service. A data storage service can use multiple data storage systems in a data center, for example, to provide reliable, non-local data storage to executing programs or various other components, systems, or services. Multiple remote archival storage systems external to the data center may also be used to store additional copies of at least some portions of at least some data storage volumes.

In this example, a data center 302 includes a number of racks 304, each rack including a number of host computing devices 306, as well as an optional rack support computing system 328 in this example embodiment. The host computing systems 306 on the illustrated rack 304 each host one or more virtual machines 326 in this example, as well as a distinct node manager module 312 associated with the virtual machines on that host computing system to manage those virtual machines. One or more other host computing systems 316 may also each host one or more virtual machines 310 in this example. Each virtual machine 310 may act as an independent resource node for executing one or more program copies or performing another such action or process for user data requests, I/O operations, etc. In addition, this example data center 302 further includes additional host computing systems 314 that do not include distinct virtual machines, but may nonetheless each act as a resource node for one or more tasks being executed for a user. In this example, a node manager module 312 executing on a computing system (not shown) distinct from the host computing systems 314 and 316 is associated with those host computing systems to manage the resource nodes provided by those host computing systems, such as in a manner similar to the node manager modules 308 for the host computing systems 306. The rack support computing system 328 may provide various utility services for other computing systems local to its rack 304 (e.g., long-term program storage, metering, and other monitoring of program execution and/or of non-local data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 302 also includes a computing system 324 that executes a storage system manager module (such as for block-based storage) for the data storage service to assist in managing the availability of non-local data storage to programs executing on resource nodes provided by the host computing systems located within the data center (or optionally on computing systems located in one or more other data centers 334, or other remote computing systems 332 external to the data center). In particular, in this example the data center 302 includes a pool of multiple data storage systems 322, which each have local storage for use in storing one or more volume copies 320. Access to the volume copies 320 is provided over the internal network(s) 318 to programs executing on various resource nodes 310 and 314. As discussed in greater detail elsewhere, a data storage system manager module 324 may provide a variety of services related to providing non-local data storage functionality, including the management of user accounts (e.g., creation, deletion, billing, etc.); the creation, use and deletion of data storage volumes and snapshot copies of those volumes; the collection and processing of performance and auditing data related to the use of data storage volumes and snapshot copies of those volumes; the obtaining of payment from customers or other users for the use of data storage volumes and snapshot copies of those volumes; etc. In some embodiments, the storage system manager module 322 may coordinate with the node manager modules 312, 308 to manage use of volumes by programs executing on associated resource nodes, while in other embodiments the node manager modules may not be used to manage such volume use. In addition, in other embodiments, one or more storage system manager modules 324 may be structured in other manners, such as to have multiple instances of the storage system manager executing in a single data center (e.g., to share the management of non-local data storage by programs executing on the resource nodes provided by the host computing systems located within the data center), and/or such as to have at least some of the functionality of a storage system manager module being provided in a distributed manner by software executing on some or all of the server data storage systems 322 (e.g., in a peer-to-peer manner, without any separate centralized storage system manager module on a computing system 324).

In this example, the various host computing systems, server data storage systems, and computing systems are interconnected via one or more internal networks 318 of the data center, which may include various networking devices (e.g., routers, switches, gateways, etc.) that are not shown. In addition, the internal networks 318 are connected to an external network 330 (e.g., the Internet or another public data network) in this example, and the data center 302 may further include one or more optional devices (not shown) at the interconnect between the data center and an external network (e.g., network proxies, load balancers, network address translation devices, etc.). In this example, the data center 302 is connected via the external network 330 to one or more other data centers 334 that each may include some or all of the computing systems and storage systems illustrated with respect to data center 302, as well as other remote computing systems 332 external to the data center. The other computing systems 332 may be operated by various parties for various purposes, such as by the operator of the data center or third parties (e.g., customers of the program execution service and/or of the data storage service). In addition, one or more of the other computing systems may be archival storage systems (e.g., as part of a remote network-accessible storage service) with which the data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems 322 may further be interconnected with one or more other networks or other connection mediums, such as a high-bandwidth connection over which the storage systems 322 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 3 has been simplified for the purposes of explanation, and that the number and organization of host computing systems, server data storage systems and other devices may be much larger than what is depicted in FIG. 3. For example, as one illustrative embodiment, there may be thousands of computing systems per data center, with at least some of those computing systems being host computing systems that may each host fifteen virtual machines or more, and/or with some of those computing systems being data storage systems that may each store several volume copies. If each hosted virtual machine executes one program, a data center may execute as many as tens of thousands of program copies at one time. Furthermore, hundreds or thousands (or more) of volumes may be stored on the server data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 3 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional storage devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 3, for example, a customer can make a Web service call into an appropriate API of a Web service layer of the system to provision a data volume and attach that volume to a data instance for that customer. The management system can be thought of as residing in a control plane, or control environment, with the data volumes and storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a storage system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

Figure 4:
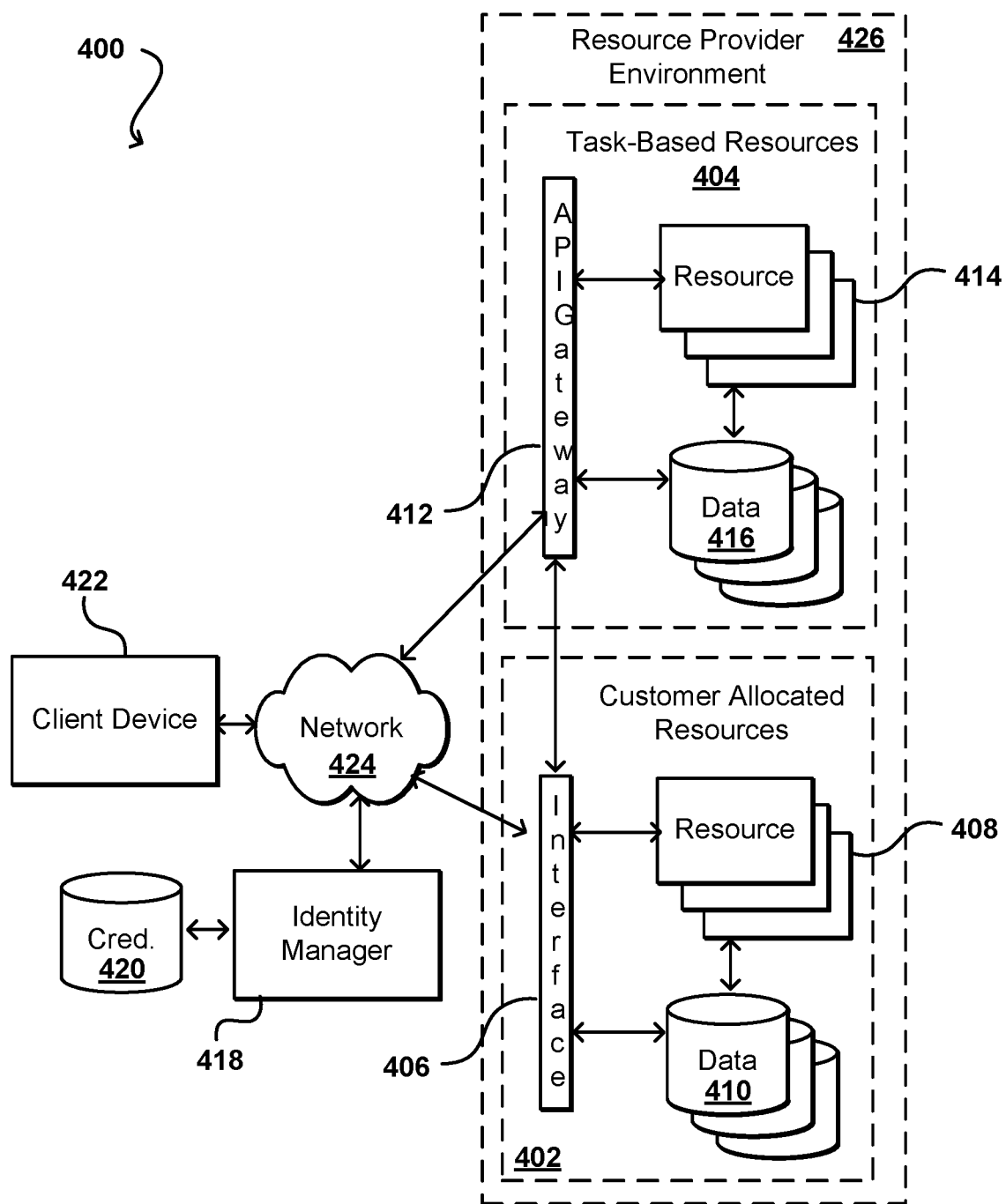
FIG. 4 illustrates an example architecture for allocating resources that can be analyzed in accordance with various embodiments.

As mentioned, the resources in such an environment can be allocated for any of a number of different purposes for performing a variety of different tasks. As an example, one of the resources can be allocated under a customer account where the customer is an application developer or other such entity. The customer can provide access to the various resources to users (e.g., employees or contractors) under the credentials or roles for that account. As an example, FIG. 4 illustrates an example computing environment 400 wherein a client device 422 is able to submit requests over at least one network 424 to be received by an interface layer of a resource provider environment 426. It should be understood that reference numbers may be carried over between figures for similar elements, for simplicity of explanation, but that such usage should not be interpreted as a limitation on the scope of the various embodiments unless otherwise specifically stated. In this example, the client device 422 is able to call into two different interface layers, although the interfaces could be part of a single layer or multiple layers in other embodiments. In this example, there can be a set of resources, both computing resources 408 and data resources 410, among others, allocated on behalf of the customer in a customer-allocated sub-environment 402 of the resource provider environment 426. These can be physical and/or virtual resources, but during the period of allocation the resources (or allocated portions of the resources) are only accessible using credentials associated with the customer account. These can include, for example, application servers and databases that are utilized over a period of time for various customer applications. The client device 422 can also make calls into an API gateway 412, or other such interface layer, of a task-based resource environment 404, or sub-environment. In such an environment, as is discussed in more detail later herein, portions of various resources can be allocated dynamically and on a task-specific basis. There can be resources allocated to perform a specific type of processing, and those resources can be allocated on an as-needed basis where the customer is only charged for the actual processing in response to a specific task.

Figure 5:
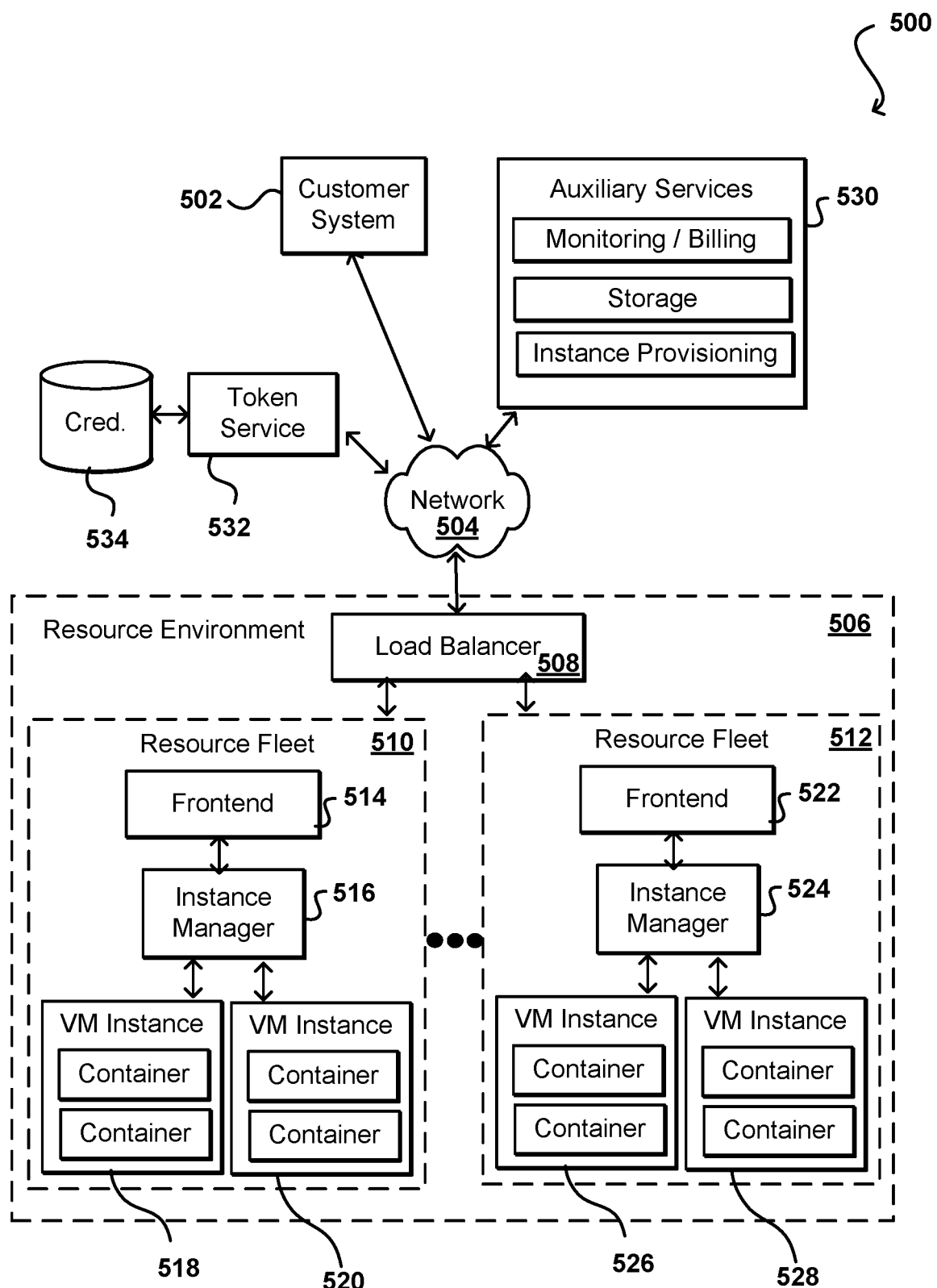
FIG. 5 illustrates an example service for allocating resources that can be analyzed in accordance with various embodiments.

An environment such as that described with respect to FIG. 5 can facilitate the handling of requests to execute user code on a virtual compute fleet by utilizing the containers created on the virtual machine instances as compute capacity. Information for a request or event can be received to a load balancer 508 that can determine an appropriate resource fleet 510, 512 to which to direct the information. As will be discussed in more detail later herein, the decision can be based upon various types of information, as may include the context associated with the type of event or request. Upon receiving a request to execute user code on a selected virtual compute fleet 510, 512, a frontend service 514, 522 associated with the virtual compute fleet can provide the information to an instance manager, which can direct the information to a virtual machine (VM) instance 518, 520, 526, 528 where a container on the instance can provide an execution environment for the registered function.

The client device 502 may utilize one or more user interfaces, command-line interfaces (CLIs), application programing interfaces (APIs), and/or other programmatic interfaces for generating and uploading customer code, invoking the customer code (e.g., submitting a request to execute the code on the virtual compute system), scheduling event-based jobs or timed jobs, tracking the customer code, and/or viewing other logging or monitoring information related to their requests and/or customer code. Although one or more embodiments may be described herein as using a user interface, it should be appreciated that such embodiments may, additionally or alternatively, use any CLIs, APIs, or other programmatic interfaces.

In the example of FIG. 5, the resource environment 506 is illustrated as being connected to at least one network 504. In some embodiments, any of the components within the recourse environment can communicate with other components (e.g., client computing devices 502 and auxiliary services 530, which may include monitoring/logging/billing services, storage service, an instance provisioning service, and/or other services that may communicate with components or services of the resource environment 506. In other embodiments, only certain components such as the load balancer 508 and/or the frontends 514, 522 may be connected to the network 504, and other components of the virtual resource service (i.e., components of the resource fleets) may communicate with other components of the resource environment 506 via the load balancer 508 and/or the frontends 514, 522.

Customer may use the resource fleets 510, 512 to execute user code thereon. For example, a customer may wish to run a piece of code in connection with a web or mobile application that the customer has developed. One way of running the code would be to acquire virtual machine instances from service providers who provide infrastructure as a service, configure the virtual machine instances to suit the customer's needs, and use the configured virtual machine instances to run the code. Alternatively, the customer may send the resource service a code execution request. The resource service can handle the acquisition and configuration of compute capacity (e.g., containers, instances, etc., which are described in greater detail below) based on the code execution request, and execute the code using the compute capacity. The allocation may automatically scale up and down based on the volume, thereby relieving the customer from the burden of having to worry about over-utilization (e.g., acquiring too little computing resources and suffering performance issues) or under-utilization (e.g., acquiring more computing resources than necessary to run the codes, and thus overpaying).

In the configuration depicted in FIG. 5, a first resource fleet 510 includes a frontend 514, an instance manager 516 (later referred to herein as a worker manager), and virtual machine instances 518, 520. Similarly, other resource fleets 512 can also include a frontend 522, an instance manager 524, and virtual machine instances 526, 528, and there can be any appropriate number of resource fleets and any appropriate number of instances in each resource fleet. The environment can include low and high frequency fleets as well in at least some embodiments, as may serve different types of requests or requests for different types of customers. The fleets can also include any number of worker managers, and in some embodiments the frontend and the worker manager can be resident on a single virtual machine instance.

In some embodiments, the load balancer 508 serves as a front door to all the other services provided by the virtual compute system. The load balancer 508 processes requests to execute user code on the virtual compute system and handles the first level of load balancing across the frontends 514, 522. For example, the load balancer 508 may distribute the requests among the frontends 514, 522 (e.g., based on the individual capacity of the frontends). The requests can be distributed evenly across the frontends or distributed based on the available capacity on the respective fleets, among other such options.

Customer code as used herein may refer to any program code (e.g., a program, routine, subroutine, thread, etc.) written in a program language. Such customer code may be executed to achieve a specific task, for example, in connection with a particular web application or mobile application developed by the user. For example, the customer code may be written in JavaScript (node.js), Java, Python, and/or Ruby. The request may include the customer code (or the location thereof) and one or more arguments to be used for executing the customer code. For example, the customer may provide the customer code along with the request to execute the customer code. In another example, the request may identify a previously uploaded program code (e.g., using the API for uploading the code) by its name or its unique ID. In yet another example, the code may be included in the request as well as uploaded in a separate location (e.g., the external storage service or a storage system internal to the resource environment 506) prior to the request is received by the load balancer 508. The virtual compute system may vary its code execution strategy based on where the code is available at the time the request is processed.

In some embodiments, the frontend 514 for a fleet can determine that the requests are properly authorized. For example, the frontend 514 may determine whether the user associated with the request is authorized to access the customer code specified in the request. The frontend 514 may receive the request to execute such customer code in response to Hypertext Transfer Protocol Secure (HTTPS) requests from a customer, or user associated with that customer. Also, any information (e.g., headers and parameters) included in the HTTPS request may also be processed and utilized when executing the customer code. As discussed above, any other protocols, including, for example, HTTP, MQTT, and CoAP, may be used to transfer the message containing the code execution request to the frontend 514. The frontend 514 may also receive the request to execute such customer code when an event is detected, such as an event that the customer has registered to trigger automatic request generation. For example, the customer may have registered the customer code with an auxiliary service 530 and specified that whenever a particular event occurs (e.g., a new file is uploaded), the request to execute the customer code is sent to the frontend 514. Alternatively, the customer may have registered a timed job (e.g., execute the user code every 24 hours). In such an example, when the scheduled time arrives for the timed job, the request to execute the customer code may be sent to the frontend 514. In yet another example, the frontend 514 may have a queue of incoming code execution requests, and when the batch job for a customer is removed from the virtual compute system's work queue, the frontend 514 may process the customer request. In yet another example, the request may originate from another component within the resource environment 506 or other servers or services not illustrated in FIG. 5.

A customer request may specify one or more third-party libraries (including native libraries) to be used along with the customer code. In one embodiment, the customer request is a ZIP file containing the customer code and any libraries (and/or identifications of storage locations thereof) that are to be used in connection with executing the customer code. In some embodiments, the customer request includes metadata that indicates the program code to be executed, the language in which the program code is written, the customer associated with the request, and/or the computing resources (e.g., memory, etc.) to be reserved for executing the program code. For example, the program code may be provided with the request, previously uploaded by the customer, provided by the virtual compute system (e.g., standard routines), and/or provided by third parties. In some embodiments, such resource-level constraints (e.g., how much memory is to be allocated for executing a particular user code) are specified for the particular customer code, and may not vary over each execution of the customer code. In such cases, the virtual compute system may have access to such resource-level constraints before each individual request is received, and the individual requests may not specify such resource-level constraints. In some embodiments, the customer request may specify other constraints such as permission data that indicates what kind of permissions that the request has to execute the user code. Such permission data may be used by the virtual compute system to access private resources (e.g., on a private network).

In some embodiments, the customer request may specify the behavior that should be adopted for handling the customer request. In such embodiments, the customer request may include an indicator for enabling one or more execution modes in which the customer code associated with the customer request is to be executed. For example, the request may include a flag or a header for indicating whether the customer code should be executed in a debug mode in which the debugging and/or logging output that may be generated in connection with the execution of the customer code is provided back to the customer (e.g., via a console user interface). In such an example, the virtual compute system 110 may inspect the request and look for the flag or the header, and if it is present, the virtual compute system may modify the behavior (e.g., logging facilities) of the container in which the customer code is executed, and cause the output data to be provided back to the customer. In some embodiments, the behavior/mode indicators are added to the request by the user interface provided to the customer by the virtual compute system. Other features such as source code profiling, remote debugging, etc. may also be enabled or disabled based on the indication provided in the request.

The frontend 514 can receive requests to execute customer code on the virtual compute system that have been processed by the load balancer 508. The frontend 514 can request the instance manager 516 associated with the frontend 514 of the particular fleet 510 to find compute capacity in one of the virtual machine instances 518, 520 managed by the instance manager 516. The frontend 514 may include a usage data manager for determining the usage status (e.g., indicating how frequently the user code is executed) of a particular customer code, and a customer code execution manager for facilitating the execution of customer code on one of the virtual machine instances managed by the worker manager. The instance manager 516 manages the virtual machine instances in the respective fleet. After a request has been successfully processed by the load balancer 508 and the frontend 514, the instance manager 516 finds capacity to service the request to execute customer code on the virtual compute system. For example, if a container exists on a particular virtual machine instance that has the user code loaded thereon, the instance manager 516 may assign the container to the request and cause the request to be executed in the container. Alternatively, if the customer code is available in the local cache of one of the virtual machine instances, the instance manager 516 may create a new container on such an instance, assign the container to the request, and cause the customer code to be loaded and executed in the container. Otherwise, the instance manager 516 may assign a new virtual machine instance to the customer associated with the request from the pool of pre-initialized and pre-configured virtual machine instances, download the customer code onto a container created on the virtual machine instance, and cause the customer code to be executed in the container.

In some embodiments, the virtual compute system is adapted to begin execution of the customer code shortly after it is received (e.g., by the load balancer 508 or frontend 514). A time period can be determined as the difference in time between initiating execution of the customer code (e.g., in a container on a virtual machine instance associated with the customer) and receiving a request to execute the customer code (e.g., received by a frontend). The virtual compute system can be adapted to begin execution of the customer code within a time period that is less than a predetermined duration. The customer code may be downloaded from an auxiliary service 530. The data may comprise user code uploaded by one or more customers, metadata associated with such customer code, or any other data utilized by the virtual compute system to perform one or more techniques described herein. Although only the storage service is illustrated in the example of FIG. 5, the resource environment 506 may include other levels of storage systems from which the customer code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system) associated with the instance on which the container is created. Alternatively, the code may be downloaded from a web-based data store provided by the storage service.

In some embodiments, once a virtual machine instance has been assigned to a particular customer, the same virtual machine instance cannot be used to service requests of any other customer. This provides security benefits to customers by preventing possible co-mingling of user resources. Alternatively, in some embodiments, multiple containers belonging to different customers (or assigned to requests associated with different customers) may co-exist on a single virtual machine instance. Such an approach may improve utilization of the available compute capacity. Although the virtual machine instances are described here as being assigned to a particular customer, in some embodiments the instances may be assigned to a group of customers, such that an instance is tied to the group of customers and any member of the group can utilize resources on the instance. For example, the customers in the same group may belong to the same security group (e.g., based on their security credentials) such that executing one member's code in a container on a particular instance after another member's code has been executed in another container on the same instance does not pose security risks. Similarly, the instance manager 516 may assign the instances and the containers according to one or more policies that dictate which requests can be executed in which containers and which instances can be assigned to which customers. An example policy may specify that instances are assigned to collections of customers who share the same account (e.g., account for accessing the services provided by the virtual compute system). In some embodiments, the requests associated with the same customer group may share the same containers (e.g., if the customer code associated therewith are identical). In some embodiments, a request does not differentiate between the different customers of the group and simply indicates the group to which the customers associated with the requests belong. In some embodiments, the virtual compute system may maintain a separate cache in which customer code is stored to serve as an intermediate level of caching system between the local cache of the virtual machine instances and a web-based network storage (e.g., accessible via the network 504).

The instance manager 516 may also manage creation, preparation, and configuration of containers within virtual machine instances. Containers can be logical units within a virtual machine instance and utilize resources of the virtual machine instances to execute customer code. Based on configuration information associated with a request to execute customer code, such a container manager can create containers inside a virtual machine instance. In one embodiment, such containers are implemented as Linux containers.

After the customer code has been executed, the instance manager 516 may tear down the container used to execute the user code to free up the resources it occupied to be used for other containers in the instance. Alternatively, the instance manager 516 may keep the container running to use it to service additional requests from the same customer. For example, if another request associated with the same customer code that has already been loaded in the container, the request can be assigned to the same container, thereby eliminating the delay associated with creating a new container and loading the customer code in the container. In some embodiments, the instance manager 516 may tear down the instance in which the container used to execute the customer code was created. Alternatively, the instance manager 516 may keep the instance running to use the instance to service additional requests from the same customer. The determination of whether to keep the container and/or the instance running after the user code is done executing may be based on a threshold time, the type of the user, average request volume of the user, and/or other operating conditions.

In some embodiments, the virtual compute system may provide data to one or more of the auxiliary services 530 as the system services incoming code execution requests. For example, the virtual compute system may communicate with the monitoring/logging/billing services, which may include: a monitoring service for managing monitoring information received from the virtual compute system, such as statuses of containers and instances on the virtual compute system; a logging service for managing logging information received from the virtual compute system, such as activities performed by containers and instances on the virtual compute system; and a billing service for generating billing information associated with executing customer code on the virtual compute system (e.g., based on the monitoring information and/or the logging information managed by the monitoring service and the logging service). In addition to the system-level activities that may be performed by the monitoring/logging/billing services (e.g., on behalf of the virtual compute system) as described above, the monitoring/logging/billing services may provide application-level services on behalf of the customer code executed on the virtual compute system. For example, the monitoring/logging/billing services may monitor and/or log various inputs, outputs, or other data and parameters on behalf of the customer code being executed on the virtual compute system. Although shown as a single block, the monitoring, logging, and billing services may be provided as separate services.

In some embodiments, the instance manager 516 may perform health checks on the instances and containers managed by the instance manager (e.g., an "active pool" of virtual machine instances managed by the instance manager and currently assigned to one or more customers). For example, the health checks performed by the instance manager 516 may include determining whether the instances and the containers managed by the instance manager have any issues of (1) misconfigured networking and/or startup configuration, (2) exhausted memory, (3) corrupted file system, (4) incompatible kernel, and/or any other problems that may impair the performance of the instances and the containers. In one embodiment, the instance manager 516 performs the health checks periodically. In some embodiments, the frequency of the health checks may be adjusted automatically based on the result of the health checks. In other embodiments, the frequency of the health checks may be adjusted based on customer requests. In some embodiments, the instance manager 516 may perform similar health checks on the instances and/or containers in the pool of pre-warmed virtual machine instances that are not yet assigned to any customer but ready to service incoming requests. The instances and/or the containers in such a warming pool may be managed either together with those instances and containers in the active pool or separately. In some embodiments, in the case where the health of the instances and/or the containers in the warming pool is managed separately from the active pool, a separate warming pool manager that manages the warming pool may perform the health checks described above on the instances and/or the containers in the warming pool.

The virtual machine instances can be logical in nature and implemented by a single or multiple physical computing devices. At least some of the virtual machine instances may be provisioned to provide a variety of different desired conditions depending on the needs of the user. Examples of the types of desired conditions include, but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the virtual compute system is logical in nature and can encompass physical computing devices from various geographic regions.

The frontend 514, 522 can route code-processing requests according to a method that is different than the method used by the load balancer 508 to route requests among the frontends. For example, a frontend 514 can route the requests to the specific instance manager based on the customer code and/or based on the customer associated with the customer code. In some embodiments, the routing is determined based on a consistent-hashing scheme in which one or more parameters associated with the request (e.g., customer ID, customer code ID, etc.) are hashed according to a hash function and the request is sent to one of the instance managers that has previously been assigned to the sections of a hash ring (e.g., containing a plurality of hash values) that corresponds to the resulting hash value. For example, the instance managers can occupy one or more sections of the hash ring, and the requests can be mapped to those same hash values. In some embodiments, the hash values may be integer values, and each instance manager may be associated with one or more integer values. The one or more integer values associated with a particular instance manager may be determined based on one or more parameters associated with the instance manager (e.g., IP address, instance ID, etc.). In some embodiments, the request may be sent to the instance manager whose associated integer values are closest to, but not larger than, the hash value calculated for that request (e.g., using modulo arithmetic).

When the frontends determine that one or more instance managers have become unavailable, the frontends can associate the hash values previously associated with the one or more instance managers that have become unavailable with one or more available instance managers in another fleet. Similarly, when a new instance manager is added to a fleet, the new instance manager may take a share of the hash values associated with the existing instance managers. For example, the new instance manager may be assigned one or more sections of the hash ring that were previously assigned to the existing instance managers.

As mentioned, resource capacity can be allocated as needed to execute code or perform specific tasks, which can be allocated in response to various events. The events can include any appropriate types of events, as may be permitted by a service provider or allowed through various rules or policies, among other such options. These can include, for example, modifications to data buckets or updates to data tables, among other such options. The dynamic allocation of such capacity enables service owners to get out of the business of provisioning and managing the underlying hardware for executing code. For flexibility and efficiency in resource management, such a platform or service might not make any guarantees with respect to reusing the same containers or resource instances for running a specific instance of code, such as a registered function, for all incoming requests.

As mentioned, in order to process various types of events a resource instance for a registered function may require access to various other resources, data sources, or other relevant systems or functionality in (or outside) a resource allocation environment. In some embodiments, a function can be configured with a specified role or identity, which will have various associated permissions and privileges. A registered function can be associated with a determined role, and when a resource instance is allocated for the registered function, the resource instance can be provided with an access token, or other appropriate security credential, which can provide the access needed for that function. As illustrated in the example 500 of FIG. 5, the token can be provided by a token service 532, which can be internal or external to the resource environment 506, and may managed by the resource provider or a third party in various embodiments. The token service can store information about various types of roles and access in a credential repository 534, or other appropriate location, and in response to a request for an access token for a registered function, can determine the appropriate role and permissions and provide a corresponding access token to be provided to the allocated resource instance. The frontend 514 or instance manager 516 for a relevant resource fleet 510 can cause the configured role to be bound to the relevant host(s) when an instance of a registered function is created on that host. The role can be bound as an instance profile or other such mechanism. Once the role is bound, the resource instance can assume the bound identity for accessing various resources or dependencies, as may include various data sources, internal or external resource, or network functionality, among other such options. The resource instance can thus obtain the temporary credentials needed to execute the registered function and process the event.

Figure 6:
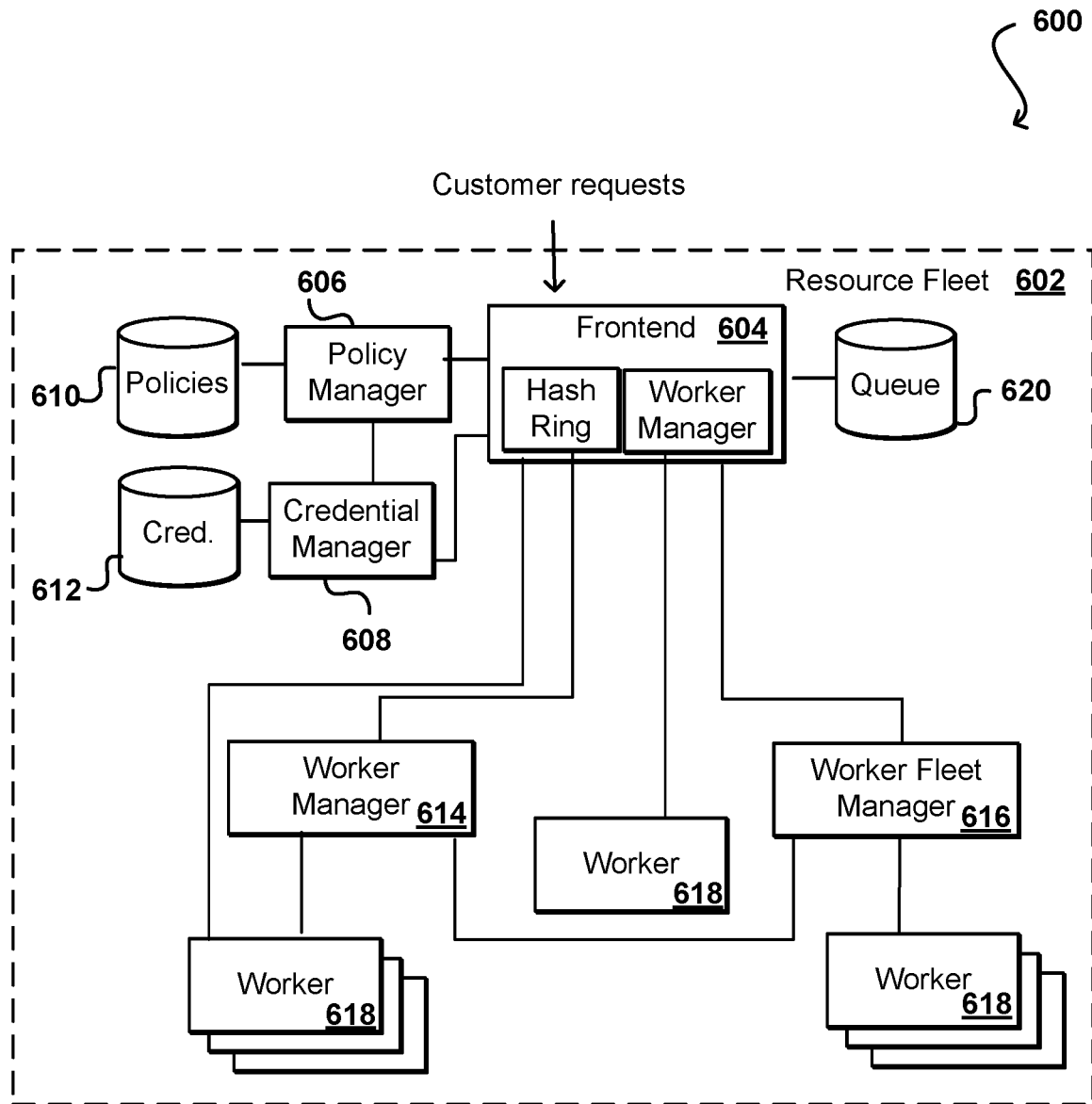
FIG. 6 illustrates an example service for allocating task-based resources that can be analyzed in accordance with various embodiments.

FIG. 6 illustrates an example environment 600 that can be used to implement at least some of this functionality. In this example, information for customer requests or events can be directed to a resource fleet 602. The information can be directed using a load balancer and/or interface layer as discussed previously as part of a resource allocation environment. In this example the resource instances will be referred to as "workers," which in various embodiments can refer to the virtual machine instances 518, 520, 526, 528 described with respect to FIG. 5. It should be understood, however, that various other types of resource instances can be utilized as workers as well within the scope of the various embodiments.

As described, the frontend 604 may receive an event notification, customer request, or other event information that indicates an event has occurred for which a registered function should be utilized or processing. In this example, the frontend 604 can determine the appropriate registered function and place the event information in an event queue 620. In other embodiments the event information might be placed into the event queue before determining the registered function, or the event information might specify the registered function, among other such options. Further, in this event the frontend 604 and/or a worker manager of the frontend can place the event information in the event queue 620, while in other embodiments other worker managers 614, 616 might receive the information and place the information in the same, or a different queue, among other such options. The frontend, worker manager, or a separate queue manager can determine that a worker 618 is now available to process the event information using the respective registered function. This can include, for example, determining that a new instance should be initialized to process the event as well as allocating an existing instance, etc. The respective worker manager 614 can then allocate the relevant worker 618 for the event, pull the event information from the event queue 620, and provide the information to the allocated worker 618 for processing using the registered function.

At some subsequent point, the allocated worker 614 will complete processing for the event. This can occur for a number of different reasons as discussed elsewhere herein. The allocated instance can return a result of the processing that can be received back to the worker manager 614 and/or the frontend 604. In some embodiments the result will go to the worker manager, so the manager knows the instance is available for processing another event, and then can go to the frontend, so the frontend can provide any appropriate response or take another appropriate action.

In order to process the event, a worker 618 will have to be allocated for the relevant registered function. As mentioned, the worker will need to obtain the appropriate access credential(s) for the registered function, as may be determined by a role bound to that instance for the registered function. As mentioned, the role can provide various types of access for a determined period of time, such as fifteen minutes in some embodiments, although other lengths of time can be specified as well. Since there can be various types of triggering events for a function, the role can enable access to all relevant data for any of those events for the entire lifecycle of the function. As mentioned, however, granting all the access provided under the role can enable any vulnerability in the registered function to access data outside the scope of the registered function, and potentially exfiltrate the credentials outside of the function for various other purposes. As an example, various parsers might be used to ingest and process different types of documents, and without a security review of those parsers there is potential that parsing of an untrusted document could expose access to the function credentials.

Figure 7:
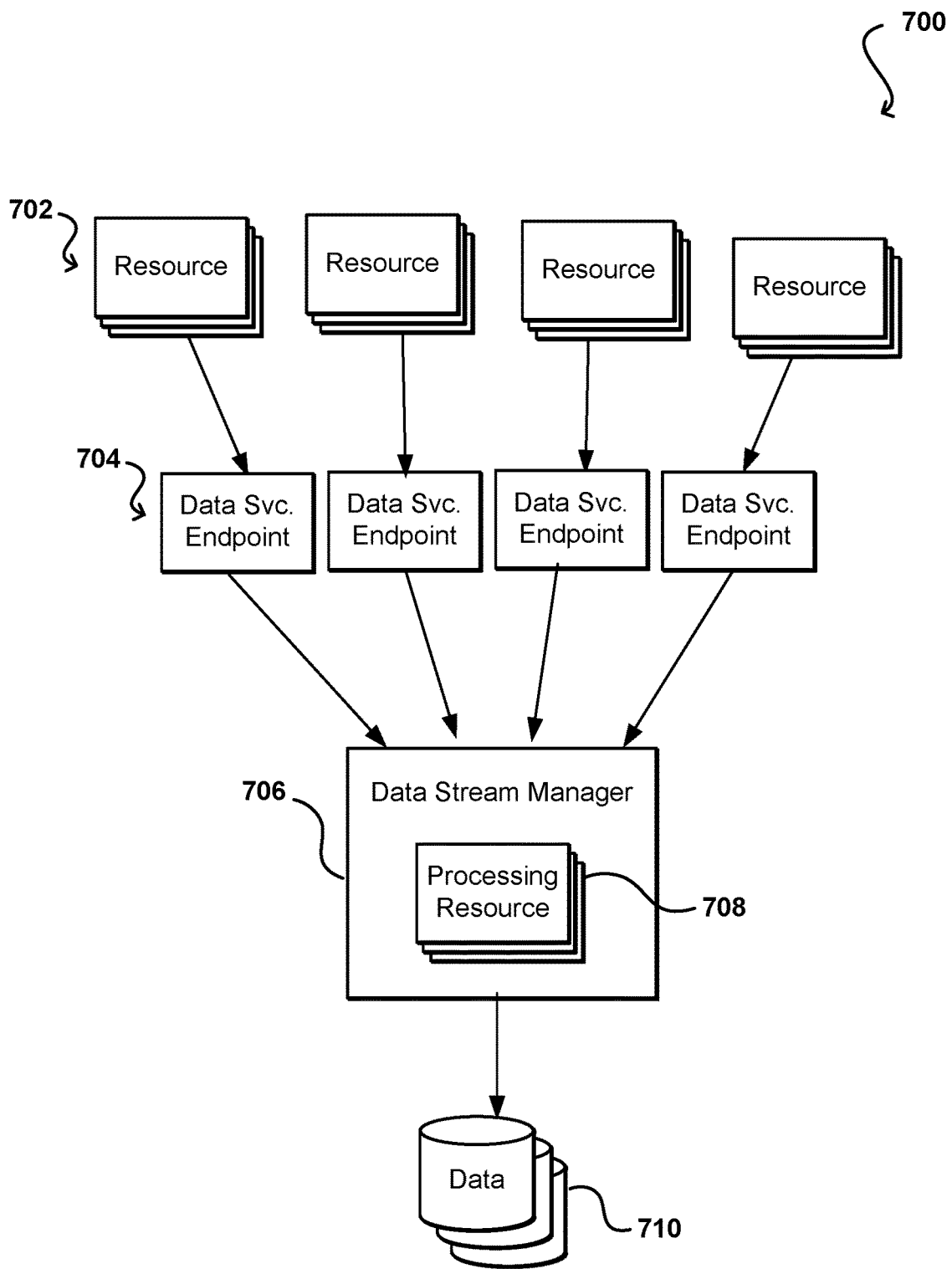
FIG. 7 illustrates an example system for aggregating data for a data stream that can be utilized in accordance with various embodiments.

FIG. 7 illustrates an example data storage architecture 700 that can be utilized to store these and other types of data in accordance with various embodiments. In this example, there are various resources 702 that each generate data to be stored by one or more data resources 710 in a resource provider environment, or other such multi-tenant or shared-resource environment. For various embodiments, aspects of dynamic data tailing can also be used with a single tenancy environment as discussed elsewhere herein. In this example, each resource 702 can be a computing resource, such as a physical or virtual server, executing a copy of a particular application. Other computing devices executing other types of code can be utilized as well. The resources 702 can each send their data to a respective data service endpoint 704, such as a front end for a data service, designated application programming interface (API), or other such mechanism. In some embodiments, a pool of front end hosts will be provided as endpoints and the respective endpoint for a resource can be determined using a load balancer or other such mechanism. The data streams received to the endpoints 704 can be directed to a data stream manager 706, which can temporarily cache the data until the data can be processed by one or more appropriate processing resources 708. The processing resources 708 can perform tasks on the data, such as to format, transform, aggregate, order, or otherwise process the data such that the data can be stored to one or more appropriate data resources 710, such as may correspond to one or more data hosts. The processing resources can be part of the data stream manager 706 and/or associated with an external system, service, or application, among other such options.

The data stream manager 706 in one embodiment comprises a platform for streaming data using Web services, such as Amazon Kinesis, which provides for the loading of data from multiple streams into data repositories and provides for real time analysis of the received data. The manager can continually collect, store, and process very large amounts of streaming data, such as several terabytes per hour or more. Such a platform can also provide the ability for customers to generate custom applications to generate, process, and/or analyze the streaming data. The ability to process such data streams provides functionality such as to perform multi-stage processing, custom stream partitioning, real time metering, and durable storage for data in transit, among others. The data service endpoints 704 can comprise front ends or interfaces for a data service, such as Amazon CloudWatch. Such a service can provide for monitoring of the various resources 702 to obtain information as discussed above, with the resources then sending streams of log data that can be received to the data stream manager for transformation and storage into the appropriate data repositories 710. The log data transmitted from the resources can be sent in small batches and in near real time. While in some embodiments each log or data record can be sent in real time as it is generated or updated, in other embodiments the data will be batched in small batches based on time, size, number, or another such criterion and transmitted in batches for processing. Such an approach can add a small amount of latency but can also significantly reduce overhead and processing capacity utilization.

Figure 8:
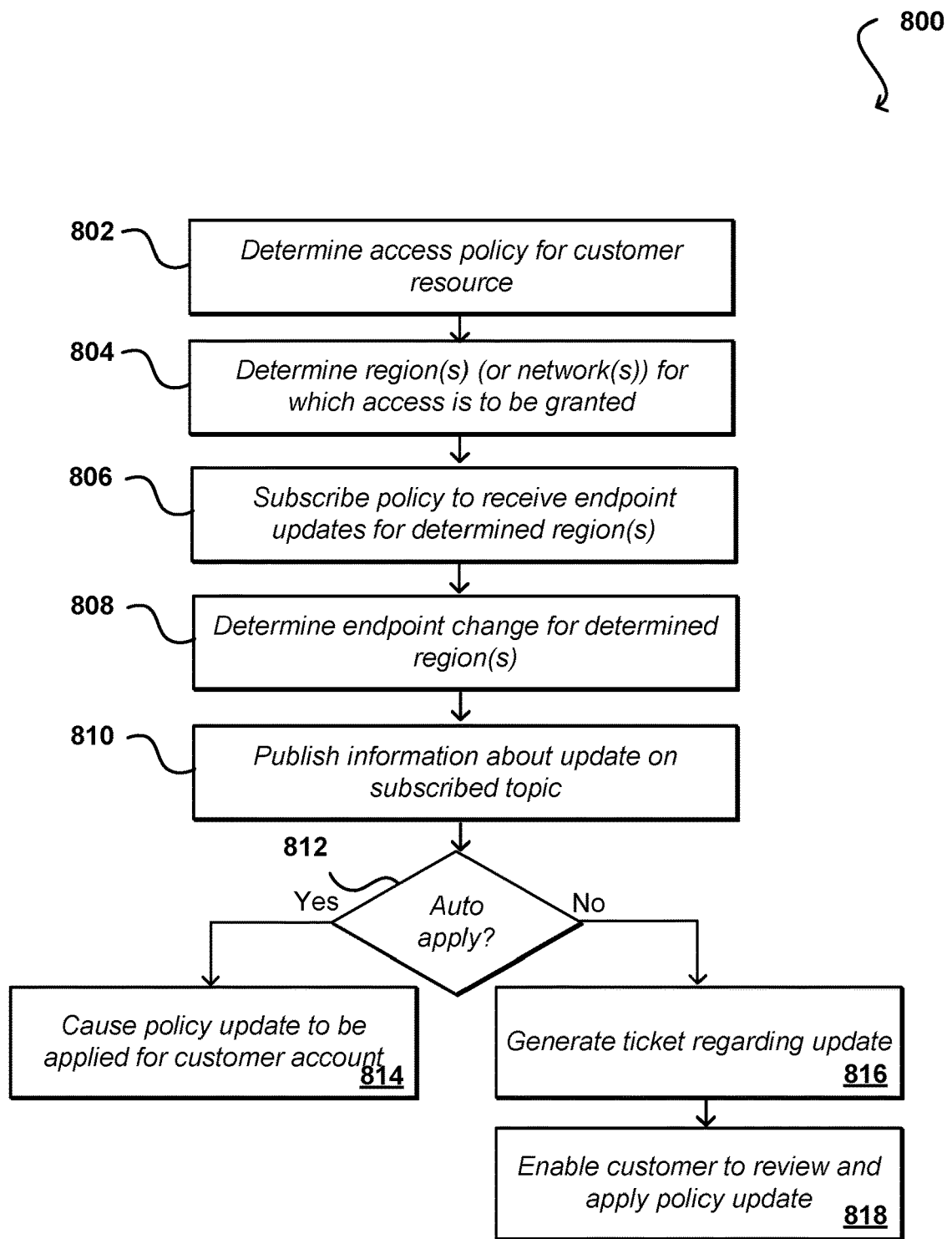
FIG. 8 illustrates an example process for updating endpoint data for a security policy that can be utilized in accordance with various embodiments.

FIG. 8 illustrates an example process 800 for automatically updating a security policy that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, an access policy (or other security policy) is determined 802 that applies to a customer resource, such as a customer data repository or customer-provided service. One or more regions or networks for which access is to be granted for the customer resource can also be determined 804. As mentioned, this can be in addition to a valid customer credential such as a username/password pair. As discussed elsewhere herein, one or more regions or networks can also be determined for which access is to be denied. These might correspond to blacklisted regions from which access is never to be granted, or sub-networks without sufficient permission to obtain access, among other such options. The policy for the customer resource can be subscribed 806 to receive endpoint updates for the corresponding network(s) or region(s).

Subsequently, it can be determined 808 that there has been an endpoint change for the corresponding network(s) or region(s). In response, information about the endpoint change can be published 810 to a topic for the policy subscribed to receive the update information. A determination can be made 812 as to whether the customer has permitted the policy update to be automatically applied. If so, the policy update can be automatically applied to the customer account such that access requests for the customer resource will be processed using up-to-date endpoint information If not, a ticket or other notification can be generated 816 regarding the update that can be sent to an administrator, technician, or other such authorized representative. The customer account administrator, for example, can then be enabled 818 to manually review and apply the policy on the customer account.

Figure 9:
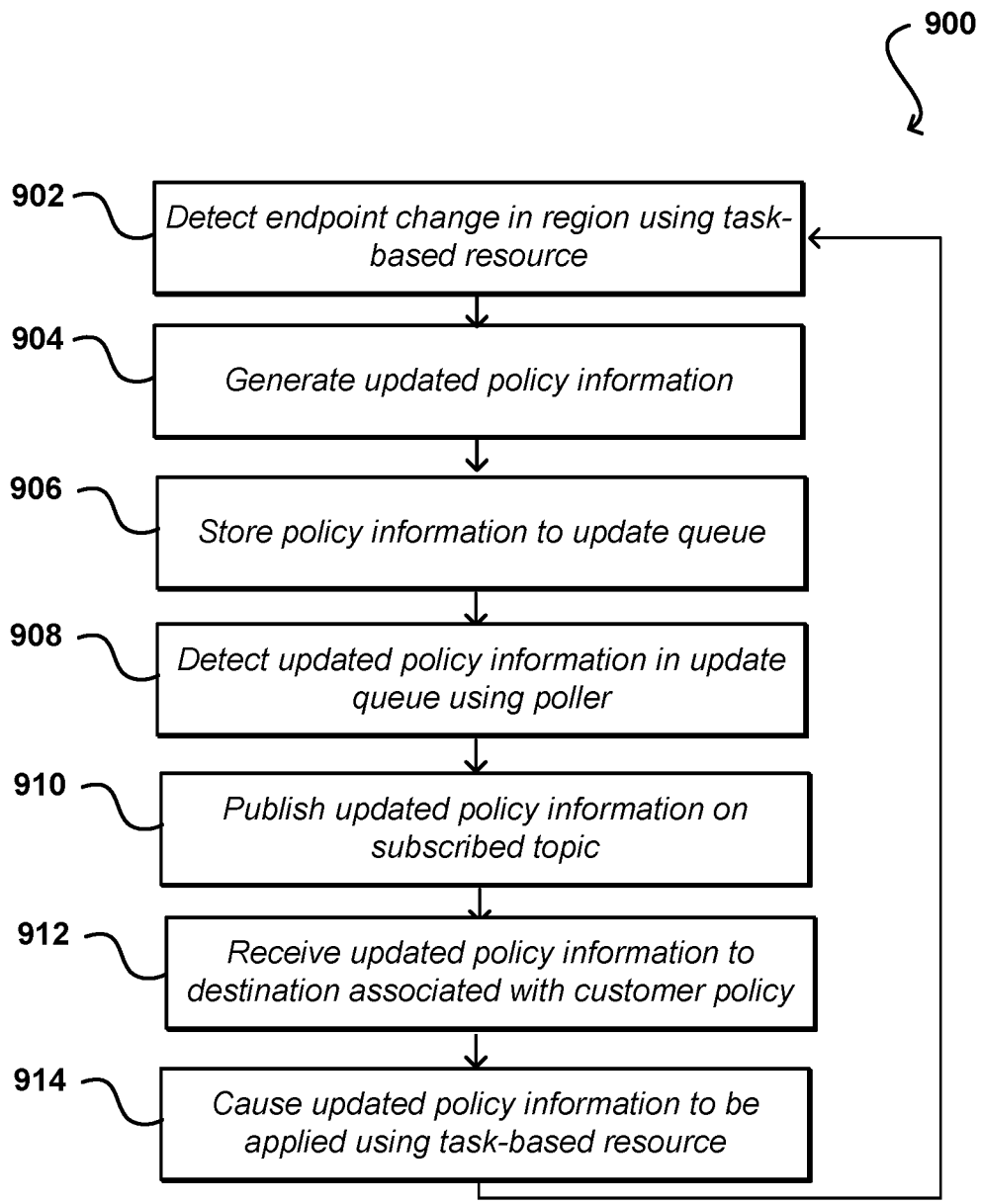
FIG. 9 illustrates an example process for generating policy updates that can be utilized in accordance with various embodiments.

FIG. 9 illustrates another example process 900 for updating security policies that can be utilized in accordance with various embodiments. In this example, an endpoint change can be detected 902 in a region (or network, etc.) using a task-based resource or other such mechanism. Updated policy information can be generated 904, such as to update access control list data or policy definitions associate with the region. The policy information can then be stored 906 to an update queue or other such location. A poller, or other such component, can detect 908 the updated policy information in the queue and cause the policy information to be published 910 on the relevant subscribed topic. As mentioned, this can include publication via email messages, instant messaging, SMS, or another such mechanism. The updated policy information can be received 912 to a destination, such as a policy manager, associated with the customer policy. The updated policy information in this example can then be caused 914 to be applied using a task-based resource, such that access to the customer resource is determined using up-to-date endpoint information. As mentioned, if the customer has not permitted automatic update application then manual review and application may be required, among other such options.

Figure 10:
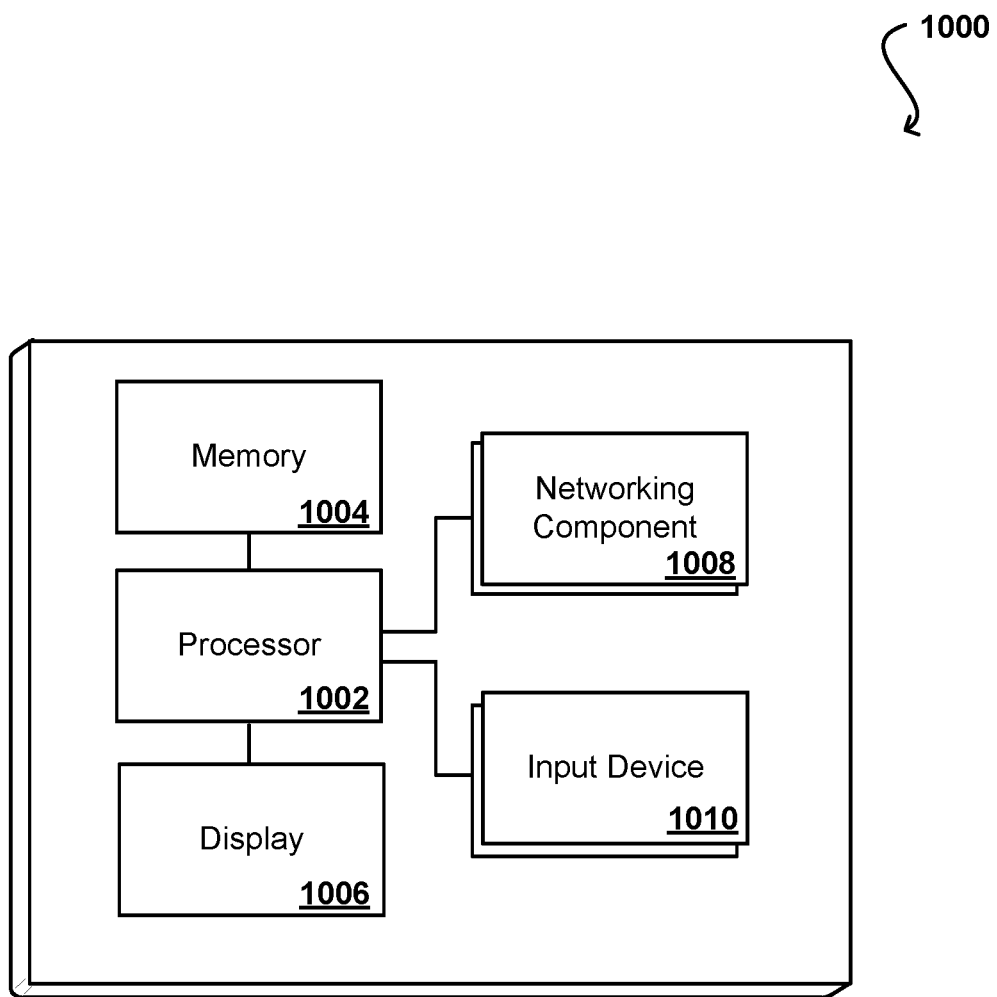
FIG. 10 illustrates example components of a computing device that can be used to implement aspects of various embodiments.

FIG. 10 illustrates a set of basic components of an example computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the at least one processor 1002, the same or separate storage can be used for images or data, a removable memory can be available for sharing information with other devices, and any number of communication approaches can be available for sharing with other devices. The device may include at least one type of display element 1006, such as a touch screen, electronic ink (e-ink), organic light emitting diode (OLED) or liquid crystal display (LCD), although devices such as servers might convey information via other means, such as through a system of lights and data transmissions. The device typically will include one or more networking components 1008, such as a port, network interface card, or wireless transceiver that enables communication over at least one network. The device can include at least one input device 1010 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    detecting, by a poller, a change in network endpoints associated with a sub-network, the network endpoints related to a subscription that is associated with a network endpoint topic and that is associated with a security policy for a resource, the security policy including an indication from an entity associated with the sub-network to automatically update policy information responsive to the change in the network endpoints;
    publishing, on the network endpoint topic, new policy information associated with the change in the network endpoints;
    determining, based at least in part on the security policy, that the new policy information should be applied; and
    causing the new policy information to be applied for the security policy, wherein the security policy including the new policy information will be enforced for a subsequent access request relating to the resource.

2. The computer-implemented method of claim 1, further comprising:
    causing the new policy information to be applied for the security policy using a policy manager of a resource provider environment, the resource being at least one of a physical computing resource or a virtual computing resource provided using resources of the resource provider environment.

3. The computer-implemented method of claim 1, further comprising:
    receiving the new policy information to a customer policy manager;
    generating a notification to a customer resource administrator regarding the new policy information; and causing the new policy information to be applied for the security policy by enabling the customer resource administrator to manually review and apply the new policy information for the security policy.

4. The computer-implemented method of claim 1, further comprising:
   detecting the change in the network endpoints using a task-based resource;
   generating the new policy information based at least in part upon the change in the network endpoints; and
   providing the new policy information for publication by the notification service.

5. The computer-implemented method of claim 4, wherein the new policy information is provided by at least one of storing the new policy information to an information queue or transmitting the new policy information using a data streaming service.

6. The computer-implemented method of claim 5, further comprising:
   periodically polling, by the poller, the information queue for the new policy information wherein the new policy information includes at least one of a new policy definition or a new access control list.

7. The computer-implemented method of claim 1, wherein the new policy information specifies at least one of endpoints for which access to the resource is to be granted or endpoints for which access is to be denied to the resource.

8. The computer-implemented method of claim 1, wherein the new policy information is published to at least one subscriber using at least one of email messaging, instant messaging, short message service messaging, or text messaging.

9. The computer-implemented method of claim 1, wherein the security policy is one of an access policy or a credential management policy.

10. The computer-implemented method of claim wherein the network endpoints correspond to IP addresses or geo-locations of at least one of a sub-network or region of computing resources.

11. The computer-implemented method of claim 1, further comprising:
   validating a customer access credential, received with the subsequent access request, before granting access to the resource in response to an endpoint of the subsequent access request falling within permissible network endpoints specified by the new policy information.

12. A system, comprising:
   at least one processor; and
   memory including instructions that, when executed by the at least one processor, cause the system to:
   detect, by a poller, a change in network endpoints associated with a sub-network, the network endpoints related to a subscription that is associated with a network endpoint topic and that is associated with a security policy for a resource, the security policy including an indication from an entity associated with the sub-network to automatically update policy information responsive to the change in the network endpoints;
   publish, on the network endpoint topic, new policy information associated with the change in the network endpoints;
   determine, based at least in part on the security policy, that the new policy information should be applied; and
   cause the new policy information to be applied for the security policy, wherein the security policy including the new policy information will be enforced for a subsequent access request relating to the resource.

13. The system of claim 12, wherein the instructions when executed further cause the system to:
   cause the new policy information to be applied for the security policy using a policy manager of a resource provider environment, the resource being at least one of a physical computing resource or a virtual computing resource provided using resources of the resource provider environment.

14. The system of claim 12, wherein the instructions when executed further cause the system to:
   receive the new policy information to a customer policy manager;
   generate a notification to a customer resource administrator regarding the new policy information; and
   enable the customer resource administrator to manually review and apply the new policy information for the security policy.

15. The system of claim 12, wherein the instructions when executed further cause the system to:
   detect the change in the network endpoints using a task-based resource;
   generate the new policy information based at least in part upon the change in the network endpoints; and
   provide the new policy information for publication by a notification service.

16. The system of claim 12, wherein the new policy information is published to at least one subscriber using at least one of email messaging, instant messaging, short message service messaging, or text messaging.

17. The system of claim 12, wherein the instructions when executed further cause the system to:
   validate a customer access credential, received with the subsequent access request, before granting access to the resource in response to an endpoint of the subsequent access request falling within permissible network endpoints specified by the new policy information.

18. A computer-implemented method, comprising:
   detecting, by a poller, a change in network endpoints associated with a sub-network, the network endpoints related to a subscription that is associated with a network endpoint topic and that is associated with a security policy for a resource, the security policy including an indication from an entity associated with the sub-network to automatically update policy information responsive to the change in the network endpoints;
   publishing, on the network endpoint topic, new policy information associated with the change in the network endpoints to at least one subscriber using at least one of email messaging, instant messaging, short message service messaging, or text messaging;
   determining, based at least in part on the security policy, that the new policy information should be applied;
   causing the new policy information to be applied for the security policy, wherein the security policy including the new policy information will be enforced for a subsequent access request relating to the resource; and
   validating a customer access credential, received with the subsequent access request, before granting access to the resource in response to an endpoint of the subsequent access request falling within permissible network endpoints specified by the new policy information.

19. The computer-implemented method of claim 18, further comprising:

causing the new policy information to be applied for the security policy using a policy manager of a resource provider environment, the resource being at least one of a physical computing resource or a virtual computing resource provided using resources of the resource provider environment.

20. The computer-implemented method of claim 18, further comprising:

receiving the new policy information to a customer policy manager;

generating a notification to a customer resource administrator regarding the new policy information; and causing the new policy information to be applied for the security policy by enabling the customer resource administrator to manually review and apply the new policy information for the security policy.

\* \* \* \* \*